(No Model.) 2 Sheets—Sheet 1.

R. T. LOMBARD.
VEHICLE SPRING.

No. 561,235. Patented June 2, 1896.

Witnesses:
Geo. W. Young
Henry Dankert

Inventor:
Robert T. Lombard.
By H. G. Underwood
C. Worner (No Model.)  2 Sheets—Sheet 2.
R. T. LOMBARD.
VEHICLE SPRING.
No. 561,235.  Patented June 2, 1896.
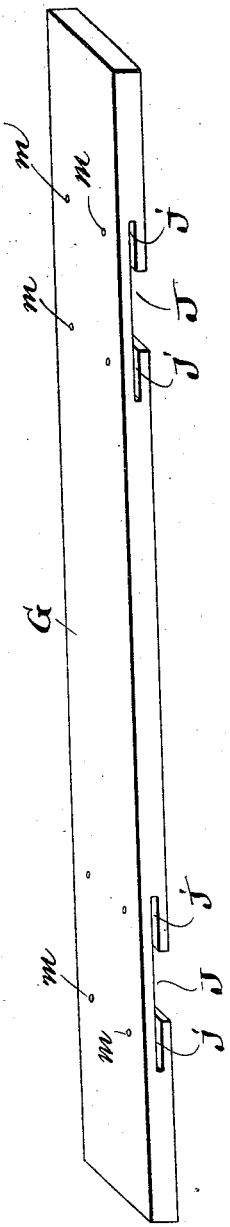
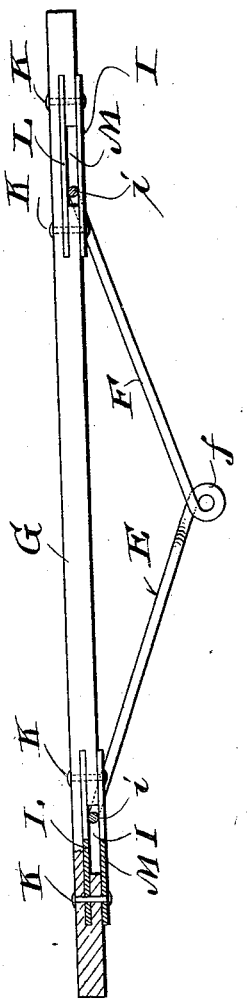
Witnesses:
Geo. W. Louey.
Henry Lankert.
Inventor:
Robert T. Lombard
By H. G. Underwood
Attorneys

UNITED STATES PATENT OFFICE.

ROBERT TOMPSON LOMBARD, OF RACINE, WISCONSIN.

VEHICLE-SPRING.

SPECIFICATION forming part of Letters Patent No. 561,235, dated June 2, 1896.

Application filed July 24, 1895. Serial No. 557,039. (No model.)

*To all whom it may concern:*

Be it known that I, ROBERT TOMPSON LOMBARD, a citizen of the United States, and a resident of Racine, in the county of Racine and State of Wisconsin, have invented certain new and useful Improvements in Vehicle-Springs; and I do hereby declare that the following is a full, clear, and exact description thereof.

My invention relates especially to that class of springs commonly called "bolster-springs;" and it consists in certain peculiarities of construction and combination of parts, as will be fully set forth hereinafter and subsequently claimed.

Figure 1:
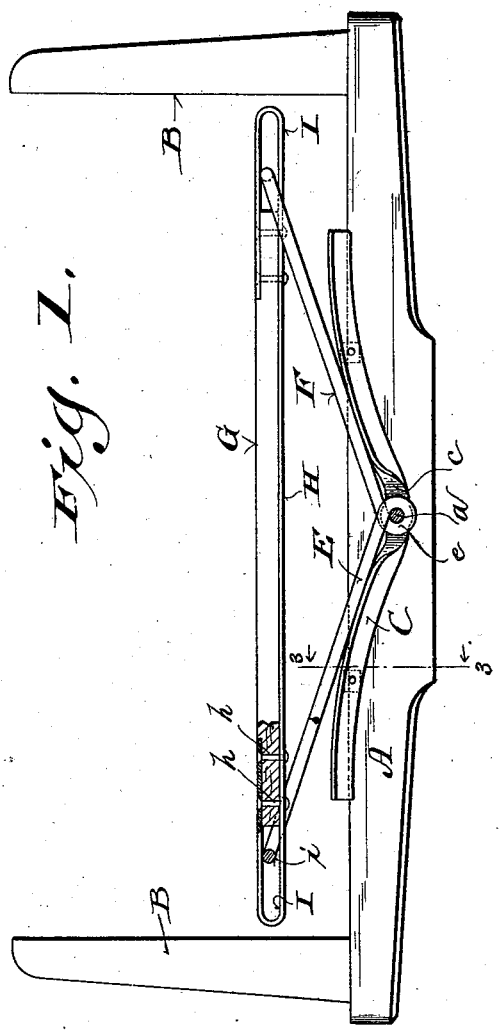
Figure 2:
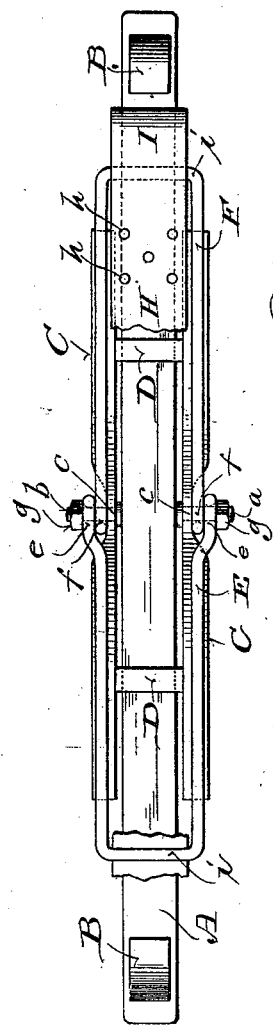
Figure 3:
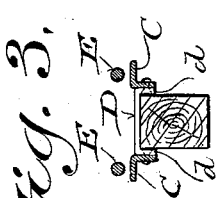

In the drawings, Figure 1 is a side elevation of a wagon-bolster fitted with springs embodying my present invention; and Fig. 2 is a plan view thereof, portions being represented as being broken away in both figures to better illustrate details of construction. Fig. 3 is a detail sectional view on the line 3 3 of Fig. 1. Figs. 4 and 5 illustrate another form of the supporting-board.

My present invention is in part an improvement on the device shown in my prior patent, No. 540,450, dated the 4th day of June, 1895, and, as in said patent, the springs are provided with variable fulcrums in the form of non-yielding arc-shaped bearings resting on or forming a part of the bolster, whereby said springs will have a yielding resistance up to the time the body supported thereon comes down into approximate contact with said bolster; but in the present case my springs are secured at a common center below the upper face of the bolster, and the arrangement of the arc-shaped bearings is diametrically opposite to that shown in said prior patent, besides which there are many differences in the construction of the two devices, as will be hereinafter shown.

Referring to the drawings, A represents a bolster having the usual standards B B, and in the preferred form illustrated in the drawings the arc-shaped bearings C C are made independently of the bolster and connected by cross-strips D, riveted or otherwise secured to the parts C, whereby the said bearings may be lifted off from the bolster or dropped to place thereon without further attachment.

Of course the parts C D may be all cast solidly together, or the parts D may be welded or riveted to the parts C, as preferred, and if desired the bolster may be formed with the described bearings C forming a part thereof or secured thereto; but by the preferred construction illustrated my devices are adapted for attachment to or use with the ordinary bolsters of vehicles now in the market.

E E designate my spring leaves or rods, the same being preferably of a general C shape, each bent from a single piece, and having their ends curved around bolts $a\ b$. These bolts pass through the central parts $c\ c$ of the parts C C of the described bearings, there being room for the heads of these bolts between the bolster A and said parts C on account of the thickness of the downturned ends $d\ d$ of the cross-strips D in the form of device illustrated in the drawings. The ends $f$ of the spring-rods F curl around the said bolts in line with the parallel arms of said spring-rods, while the ends $e$ of the spring-rods E are offset outwardly, as shown in Fig. 2, but in both instances the extreme ends of the rods come up from the under side to bear against the under surface of said spring-rods, as shown in Fig. 1, the said ends being secured in place on the bolts $a\ b$, as by nuts $g\ g$. The parts C C are made preferably of angle-iron or with horizontal flanges to form the described arc-shaped bearing-surfaces for the spring-rods E F, and these horizontal flanges are bent down at the centers $c$, as best shown in Fig. 1.

G represents a beam or board, designed to serve as a rest for the vehicle-body, and H is a preferably continuous piece of thin metal carried around the ends and under side of the said beam or board G and secured to the upper side thereof, as by rivets or bolts $h\ h$, the said metal extending beyond the said ends of the beam or board G to form loops I I, which receive and afford space for play of the transverse parts $i\ i$ of the spring-rods E F. The upper surfaces of the beam or board G are preferably reduced adjacent to the ends thereof to enable the upper surface of the bent-over ends of the metal piece H to come flush with the top of the said beam or board, so as to form everywhere a smooth supporting-surface for the vehicle-body, and the loops I I of said metal piece H fall short at each end of the bolster-standards B B to avoid any wear or frictional contact therewith.

The operation of my device will be readily understood from the foregoing description of its construction. As load comes upon the spring-rods at one side of the vehicle the said spring-rods will come more and more upon the arc-shaped bearing beneath the spring, the transverse outer end $i$ of the spring moving freely outwardly within the loop H, and thereby the fulcrum will be gradually shifted and the spring stiffened as the pressure thereon increases, while the outer end of the other spring will have plenty of play within its loop, and hence will not cramp or bind, and will be ready to sustain its part when the weight or pressure of the load shifts to the opposite side of the vehicle.

While I prefer to make each pair of spring leaves or rods in a single piece, as shown, it will be understood that the parallel portions thereof may otherwise be transversely united at the outer ends, as by an independent bolt or cross-piece properly secured, instead of by the integral portion $i$ shown, (or the transverse ends need not be united,) without departing from the spirit of my invention; but this is so obvious that I have not deemed it necessary to illustrate the same.

In Figs. 4 and 5 I illustrate a somewhat different construction of the described vehicle-body-supporting beam or board G. In this form I dispense with the continuous metal piece H, (shown in Figs. 1 and 2,) and in order to form the necessary slots or loops for the reception of the transverse ends $i$ $i$ of the spring leaves or rods E F, I cut or groove out the said beam or board G transversely on the under side, as shown at J $j$ $j$ in the perspective view, Fig. 4, and in the upper and wider portions $j$ $j$ of said grooves I insert metallic wear-plates L, and beneath these plates, on the under surface of the board G, I put other metallic wear-plates M and secure all the parts together, as by bolts or rivets K K, passed vertically through holes $m$ $m$ in the board G and through corresponding holes in the said wear-plates L M, thereby forming the desired slots I for the said transverse ends $i$ of the spring leaves or rods, as shown in Fig. 5. By this construction the beams or boards G can be made of a uniform length, somewhat greater than their length in use, leaving the user to cut them off to any length desired in any given instance, as some people might like the beams or boards G to rest close against the bolster-standards B, (or even to straddle them, which could be done by cutting slots in the ends of the beams or boards G,) while others prefer a space between the adjacent portions of the said parts B and G. In this way it is unnecessary to make up the parts G in a great number of different lengths to suit the fancies of different customers, as would be necessary with the construction shown in Figs. 1 and 2, and at the same time the wear-plates L M perform every office and have all the advantages of the metallic loops or ends of the strips H shown in said form of the device.

Having thus described my invention, what I claim as new, and desire to secure by Letters Patent, is—

1. A vehicle-spring, comprising arc-shaped bearings rising upwardly and outwardly from the center, two pairs of spring leaves or rods pivotally attached at a common center to said bearings below the lowest bearing-line of said arcs, and normally in contact with some portion of said arc-shaped bearings, and terminating in outer transverse ends, and a beam or board loosely connected at its ends to said outer transverse ends of the spring leaves or rods for affording play thereto, substantially as set forth.

2. A vehicle-spring, comprising two pairs of arc-shaped bearing-plates connected together so as to straddle and rest upon a bolster, and rising upwardly and outwardly from a lowest point at the center thereof, two pairs of spring leaves or rods pivotally attached at a common center to said bearing-plates at the centers thereof, and normally in contact with some portion of said arc-shaped bearing-plates and terminating in outer transverse ends, and a beam or board provided with slots or loops for the reception of the said transverse ends of the said spring leaves or rods, substantially as set forth.

3. A vehicle-spring, comprising two pairs of arc-shaped bearing-plates, each pair rising upwardly and outwardly from a lowest point at the center thereof and connected together so as to straddle and rest upon a bolster, two pairs of spring leaves or rods pivotally attached at a common center to bolts projecting from the described centers of the said plates, and normally in contact with some portion of the said bearing-plates, and each pair of said spring leaves or rods being transversely united at the outer end, and a beam or board having slots or loops at each end for receiving and affording play to the said transverse outer ends of the said spring leaves or rods, substantially as set forth.

4. A vehicle-spring, comprising a bolster, arc-shaped bearings rising upwardly and outwardly from the center of the bolster, two pairs of spring leaves or rods pivotally attached to a common center below the upper face of the bolster and normally in contact with some portion of the said arc-shaped bearings, each pair of said spring leaves or rods being transversely united at the outer end, and a beam or board having slots or loops at each end for receiving and affording play to the said transverse outer ends of the said spring leaves or rods, substantially as set forth.

In testimony that I claim the foregoing I have hereunto set my hand, at Racine, in the county of Racine and State of Wisconsin, in the presence of two witnesses.

ROBERT TOMPSON LOMBARD.

Witnesses:
E. B. KILBOURN,
L. J. EVANS.